(12) United States Patent
Pevtsov et al.

(10) Patent No.: US 11,775,573 B2
(45) Date of Patent: Oct. 3, 2023

(54) METHOD OF AND SERVER FOR RETRAINING MACHINE LEARNING ALGORITHM

(71) Applicant: YANDEX EUROPE AG, Lucerne (CH)

(72) Inventors: Sergey Evgenievich Pevtsov, Moscow (RU); Mikhail Yurievich Kostin, Moscow (RU); Anton Olegovich Chigin, Moscow (RU); Dmitry Sergeevich Vasilyev, Ufa (RU)

(73) Assignee: YANDEX EUROPE AG, Lucerne (CH)

( * ) Notice: Subject to any disclaimer, the term of this patent is extended or adjusted under 35 U.S.C. 154(b) by 425 days.

(21) Appl. No.: 16/836,656

(22) Filed: Mar. 31, 2020

(65) Prior Publication Data

US 2020/0327162 A1 Oct. 15, 2020

(30) Foreign Application Priority Data

Apr. 15, 2019 (RU) ................................ 2019111281

(51) Int. Cl.
*G06F 16/30* (2019.01)
*G06F 16/906* (2019.01)
*G06F 16/9536* (2019.01)
*G06F 16/903* (2019.01)
*G06K 9/62* (2022.01)
(Continued)

(52) U.S. Cl.
CPC ........ *G06F 16/906* (2019.01); *G06F 16/9038* (2019.01); *G06F 16/90335* (2019.01); *G06F 16/9536* (2019.01); *G06K 9/6257* (2013.01); *G06N 20/00* (2019.01); *G06V 30/413* (2022.01)

(58) Field of Classification Search
None
See application file for complete search history.

(56) References Cited

U.S. PATENT DOCUMENTS 8,386,509 B1 * 2/2013 Scofield .............. G06F 16/9535
707/706
9,275,347 B1 3/2016 Harada et al.
(Continued)

FOREIGN PATENT DOCUMENTS

| CN | 106776982 A | 5/2017 |
|---|---|---|
| RU | 2018122689 A | 12/2019 |
| WO | 17060894 A1 | 4/2017 |

*Primary Examiner* — Polina G Peach
(74) *Attorney, Agent, or Firm* — BCF LLP

(57) ABSTRACT

There is provided a method and a server for retraining a machine learning algorithm (MLA), the MLA having been trained to classify documents based on features thereof. A resource having a plurality of content items submitted by users is accessed. At least one content item associated with a document having been presented as a search result by a search engine server in response to a search query is identified. The at least one content item is analyzed based on a set of features to determine if the document has been misclassified by the MLA in response to the search query. In response to determining that the document has been misclassified, a training object is generated based on the misclassified document. Other misclassified documents are identified in a similar manner to obtain a set of training objects. The MLA is then retrained based on the set of training objects.

18 Claims, 7 Drawing Sheets

(51) Int. Cl.
*G06N 20/00* (2019.01)
*G06F 16/9038* (2019.01)
*G06V 30/413* (2022.01)
*G06F 16/00* (2019.01)

(56) References Cited

U.S. PATENT DOCUMENTS

| | | | |
|---|---|---|---|
| 9,324,022 B2 * | 4/2016 | Williams, Jr. | G06N 3/0454 |
| 9,710,829 B1 | 7/2017 | Sitapara et al. | |
| 9,792,530 B1 | 10/2017 | Wu et al. | |
| 10,068,185 B2 * | 9/2018 | Amershi | G06N 20/00 |
| 10,176,500 B1 * | 1/2019 | Mohan | G06Q 30/0277 |
| 10,719,301 B1 * | 7/2020 | Dasgupta | G06K 9/6267 |
| 2006/0184577 A1 | 8/2006 | Kurapati et al. | |
| 2007/0260568 A1 * | 11/2007 | Perng | G06N 5/025 |
| | | | 706/47 |
| 2009/0128573 A1 * | 5/2009 | Lambe | G06F 16/40 |
| | | | 345/530 |
| 2009/0204703 A1 * | 8/2009 | Garofalakis | G06Q 10/00 |
| | | | 709/224 |
| 2009/0274364 A1 | 11/2009 | Shakya et al. | |
| 2009/0287655 A1 | 11/2009 | Bennett | |
| 2010/0082627 A1 * | 4/2010 | Lai | G06F 16/9535 |
| | | | 707/738 |
| 2014/0161416 A1 * | 6/2014 | Chou | H04N 21/6125 |
| | | | 386/241 |
| 2015/0003672 A1 * | 1/2015 | Sarkis | G06V 40/20 |
| | | | 382/103 |
| 2015/0254555 A1 * | 9/2015 | Williams, Jr. | G06N 3/084 |
| | | | 706/14 |
| 2016/0042069 A1 * | 2/2016 | Lee-Goldman | G06Q 50/00 |
| | | | 707/706 |
| 2016/0155063 A1 * | 6/2016 | Rich | G06N 5/022 |
| | | | 706/12 |
| 2016/0171682 A1 | 6/2016 | Abedini et al. | |
| 2017/0262433 A1 | 9/2017 | Chester et al. | |
| 2017/0293859 A1 | 10/2017 | Gusev et al. | |
| 2017/0316281 A1 | 11/2017 | Criminisi et al. | |
| 2017/0330054 A1 | 11/2017 | Fu et al. | |
| 2018/0204135 A1 * | 7/2018 | Narasimha | G06F 16/35 |
| 2018/0232487 A1 * | 8/2018 | Erard | G06F 21/602 |
| 2018/0285176 A1 * | 10/2018 | Mozhaev | G06F 16/951 |
| 2018/0293242 A1 * | 10/2018 | Shishkin | G06F 16/3347 |
| 2019/0164017 A1 * | 5/2019 | Chen | G06K 9/6259 |
| 2020/0242144 A1 * | 7/2020 | Yoshida | G06F 16/3329 |
| 2020/0265153 A1 * | 8/2020 | Li | G06F 21/6218 |
| 2020/0311146 A1 * | 10/2020 | Guo | G06F 16/90332 |

* cited by examiner

METHOD OF AND SERVER FOR RETRAINING MACHINE LEARNING ALGORITHM

CROSS-REFERENCE

The present application claims priority to Russian Patent Application No. 2019111281, entitled "Method of and Server for Retraining Machine Learning Algorithm", filed Apr. 15, 2019, the entirety of which is incorporated herein by reference.

FIELD

The present technology relates to search engines and machine learning algorithms in general, and more specifically, to a method of and a system for retraining a machine learning algorithm.

BACKGROUND

Machine learning algorithms (MLAs) are used to address multiple needs in computer-implemented technologies. Typically, the MLAs are used for generating a prediction associated with a user interaction with a computer device. One example of an area where such prediction is required is user interaction with the content available on the Internet (as an example).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

In the search engine example, the MLA is used for generating the ranked search results. The MLA may also be used for classifying queries, documents, such as web pages, images, videos, emails, and for classifying users based on their past interactions with services associated with the search engine, for example.

United States Patent Application Publication No. 2009/0287655 A1 published on Nov. 19, 2009 and assigned to RPX Corp and entitled "Image search engine employing user suitability feedback" teaches an Internet infrastructure that supports searching of images by correlating a search image and/or search string with that of plurality of images hosted in Internet based servers. The image search server supports delivery of search result pages to a client device based upon a search string or search image, and contains images from a plurality of Internet based web hosting servers. The image search server delivers a search result page containing images upon receiving a search string and/or search image from the web browser. The selection of images in the search result page is based upon: (i) word match, that is, by selecting images, titles of which correspond to the search string; and (ii) image correlation, that is, by selecting images, image characteristics of which correlates to that of search image. The selection of images in the search result page also occurs on the basis of popularity and may be refined by taking into account user feedback/preferences.

United States Patent Application Publication No. 2006/0184577 A1 published on Aug. 17, 2006, assigned to IAC Search and Media Inc and entitled "Methods and apparatuses to determine adult images by query association" teaches various methods and apparatuses for an adult content detection implementation. In one embodiment, a method detects adult content images by tracked query association to a user's query for an image search. The set of images returned in response to the user's query on a search engine are based on whether one or more images in the set are classified as an adult content image.

United States Patent Application Publication No. 2009/0274364 A1 published on Nov. 5, 2009, assigned to Oath Inc and entitled "Apparatus and methods for detecting adult videos" teaches apparatus and methods for detecting whether a video is adult or non-adult. In certain embodiments, a learning system is operable to generate one or more models for adult video detection. The model is generated based on a large set of known videos that have been defined as adult or non-adult. Adult detection is then based on this adult detection model. This adult detection model may be applied to selected key frames of an unknown video. In certain implementations, these key frames can be selected from the frames of the unknown video. Each key frame may generally correspond to a frame that contains key portions that are likely relevant for detecting pornographic or adult aspects of the unknown video. By way of examples, key frames may include moving objects, skin, people, etc. In alternative embodiments, a video is not divided into key frames and all frames are analyzed by a learning system to generate a model, as well as by an adult detection system based on such model.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developer(s) of the present technology have appreciated at least one technical problem associated with the prior art approaches.

Embodiments of the present technology have been developed based on developers' appreciation that the performance of a machine learning algorithm (such as accuracy of predictions rendered, and the like) depends on the quality and the quantity of training objects provided during a training phase of the machine learning algorithm. Developers have also appreciated that in some cases it may be tedious and financially expensive to obtain large quantities of quality training objects.

Thus, a machine learning algorithm may incorrectly make predictions, as an example by misclassifying an object, specifically when the object contains features that are shared by different classes, and when the machine learning algorithm has never been trained on such objects. While such occurrences typically happen, it may be sometimes problematic, as an example when the allocation of computational, and/or financial resources depend on a result of a classification performed by the machine learning algorithm, or when users are exposed to content that has been explicitly ruled out, such as children stumbling upon shocking or otherwise inappropriate images in a parental mode operation of a web browser for example.

Developers' of the present technology have also appreciated that search engine operators, such as Google™, Yandex™, Bing™ and Yahoo™, among others, have access to a large amount of user interaction data with respect to search results appearing in response to user search queries. Developers' have also appreciated that user interaction data may be leveraged to understand user behavior and infer user preference of users of the search engine service.

Developers' have also appreciated that social networking services, which provide communication platforms to users, such as Facebook™, VKontakte™, Twitter™, among others, may in some cases provide application programming interfaces (APIs) or other means for allowing third parties to analyze what has been submitted by users on the social networks (provided that users have provided their consent and appropriate settings), which may be also be used to understand user behavior and infer user preference of users of the social networking services.

Developers, have acknowledged that users may submit content on social networking services, such as text, hyperlink(s), or images for example, which may be associated with, or refer to, documents on the search engine service. Developers have theorized that such content items may sometimes cause changes in user behavior and user traffic on the social networking service, as well as on the search engine service, because the content items may refer to documents having been misclassified on the search engine service, which users may have found humoristic or shocking for example, and decided to post on the social networking service. Developers of the present technology have recognized that such situations could be to automatically find documents having been misclassified by a MLA, where the misclassified document may be used to retrain the MLA to improve its precision and accuracy.

Thus, embodiments of the present technology are directed to a method of and system for retraining a machine learning algorithm.

In accordance with a first broad aspect of the present technology, there is provided a method of retraining a machine learning algorithm (MLA), the MLA having been trained to classify documents based on features thereof. The MLA is executed on a server, and the method is executable by the server. The method comprises accessing, by the server via the communication network, a resource, the resource having a plurality of content items, each content item of the plurality of content items having been submitted by at least one user on the resource. The method comprises identifying, by the server, based on a first set of features, at least one content item of the plurality of content items associated with a document having been presented as a search result by a search engine server in response to a search query. The server analyzes, based on a set of document features of the document, the at least one content item of the plurality of content items to determine if the document has been misclassified by the MLA in response to the search query. In response to determining that the document has been misclassified: the server generates, based on the document, a training object, the generating including labelling the document with an indication of a misclassification. The MLA is then retrained based on the training object.

In some embodiments of the method, the server is connected to a database. The method further comprises, prior to the accessing the resource: acquiring, by the server from the database, a plurality of search queries having been previously submitted on the server by a plurality of users, each search query being associated with a respective set of documents having been presented as search results to respective users of the plurality of users. The method comprises acquiring, by the server from the database, for each search query of the plurality of search queries, respective traffic information, the respective traffic information including a respective number of submissions, and determining, by the server, based on the respective number of submissions, the search query.

In some embodiments of the method, the respective traffic information further includes a respective traffic source. The determining the search query further comprises determining the resource based on the respective traffic source.

In some embodiments of the method, the determining the resource is further based on the resource being one of a predetermined list of traffic sources.

In some embodiments of the method, the determining the search query based on the respective number of submissions is further based on the respective number of submissions being above a predetermined threshold during a predetermined period of time.

In some embodiments of the method, the server is connected to a database. The method further comprises, prior to the accessing the resource: acquiring, by the server from the database, a plurality of search queries having been previously submitted on the server by a plurality of users, each search query being associated with a respective set of documents having been presented as search results to respective users of the plurality of users. The method comprises acquiring, by the server from the database, for each search query of the plurality of search queries, respective traffic information, the respective traffic information including a respective number of submissions and a respective traffic source. The method comprises determining, by the server, based on the respective number of submissions and the respective traffic source, the resource, the resource being associated with at least one query.

In some embodiments of the method, the first set of features comprises: an indication of the search query, and an indication of at least one document of the respective set of documents having been presented as the search results to the search query.

In some embodiments of the method, the first set of features further comprises a predetermined word list.

In some embodiments of the method, the document is an image, and the set of document features is a set of image features.

In some embodiments of the method, the document being misclassified is indicative of the search result being non-responsive to the search query.

In some embodiments of the method, the document being misclassified is indicative of the search result being non-suitable for the search query.

In some embodiments of the method, he document being misclassified is indicative of the search result being non-appropriate to a mode of operation of a web browser used by a user submitting the search query.

In some embodiments of the method, the MLA is a binary classifier.

In some embodiments of the method, the resource is a social network.

In accordance with another broad aspect of the present technology, there is provided a server for retraining a machine learning algorithm (MLA), the MLA having been trained to classify documents based on features thereof, and the server is connected to a communication network. The server comprises a processor, and a non-transitory computer-readable medium comprising instructions. The processor, upon executing the instructions, is configured to: access via the communication network, a resource, the resource having a plurality of content items, each content item of the plurality of content items having been submitted by at least one user on the resource. The processor is configured to identify based on a first set of features, at least one content item of the plurality of content items associated with a document having been presented as a search result by a search engine server in response to a search query. The processor is configured to analyze, based on a set of document features of the document, the at least one content item of the plurality of content items to determine if the document has been misclassified by the MLA in response to the search query. In response to determining that the document has been misclassified, the processor is configured to: generate, based on the document, a training object, the generating including labelling the document with an indication of a misclassification, and retrain the MLA based on the training object.

In some embodiments of the server, the server is connected to a database. The processor is further configured to, prior to the accessing the resource: acquire from the database, a plurality of search queries having been previously submitted on the server by a plurality of users, each search query being associated with a respective set of documents having been presented as search results to respective users of the plurality of users. The processor is configured to acquire from the database, for each search query of the plurality of search queries, respective traffic information, the respective traffic information including a respective number of submissions, and determine, based on the respective number of submissions, the search query.

In some embodiments of the server, the respective traffic information further includes a respective traffic source, and the determining the search query further comprises determining the resource based on the respective traffic source.

In some embodiments of the server, the determining the resource is further based on the resource being one of a predetermined list of traffic sources.

In some embodiments of the server, the determining the search query based on the respective number of submissions is further based on the respective number of submissions being above a predetermined threshold during a predetermined period of time.

In some embodiments of the server, the server is connected to a database. The processor is further configured to, prior to the accessing the resource: acquire from the database, a plurality of search queries having been previously submitted on the server by a plurality of users, each search query being associated with a respective set of documents having been presented as search results to respective users of the plurality of users. The processor is configured to acquire from the database, for each search query of the plurality of search queries, respective traffic information, the respective traffic information including a respective number of submissions and a respective traffic source. The processor is configured to determine based on the respective number of submissions and the respective traffic source, the resource, the resource being associated with at least one query.

In some embodiments of the server, the first set of features comprises: an indication of the search query, and an indication of at least one document of the respective set of documents having been presented as the search results to the search query.

In some embodiments of the server, the first set of features further comprises a predetermined word list.

In some embodiments of the server, the document is an image, and the set of document features is a set of image features.

In some embodiments of the server, the document being misclassified is indicative of the search result being non-responsive to the search query.

In some embodiments of the server, the document being misclassified is indicative of the search result being non-suitable for the search query.

In some embodiments of the server, the document being misclassified is indicative of the search result being non-appropriate to a mode of operation of a web browser used by a user submitting the search query.

In some embodiments of the server, the MLA is a binary classifier.

In some embodiments of the server, the resource is a social network.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
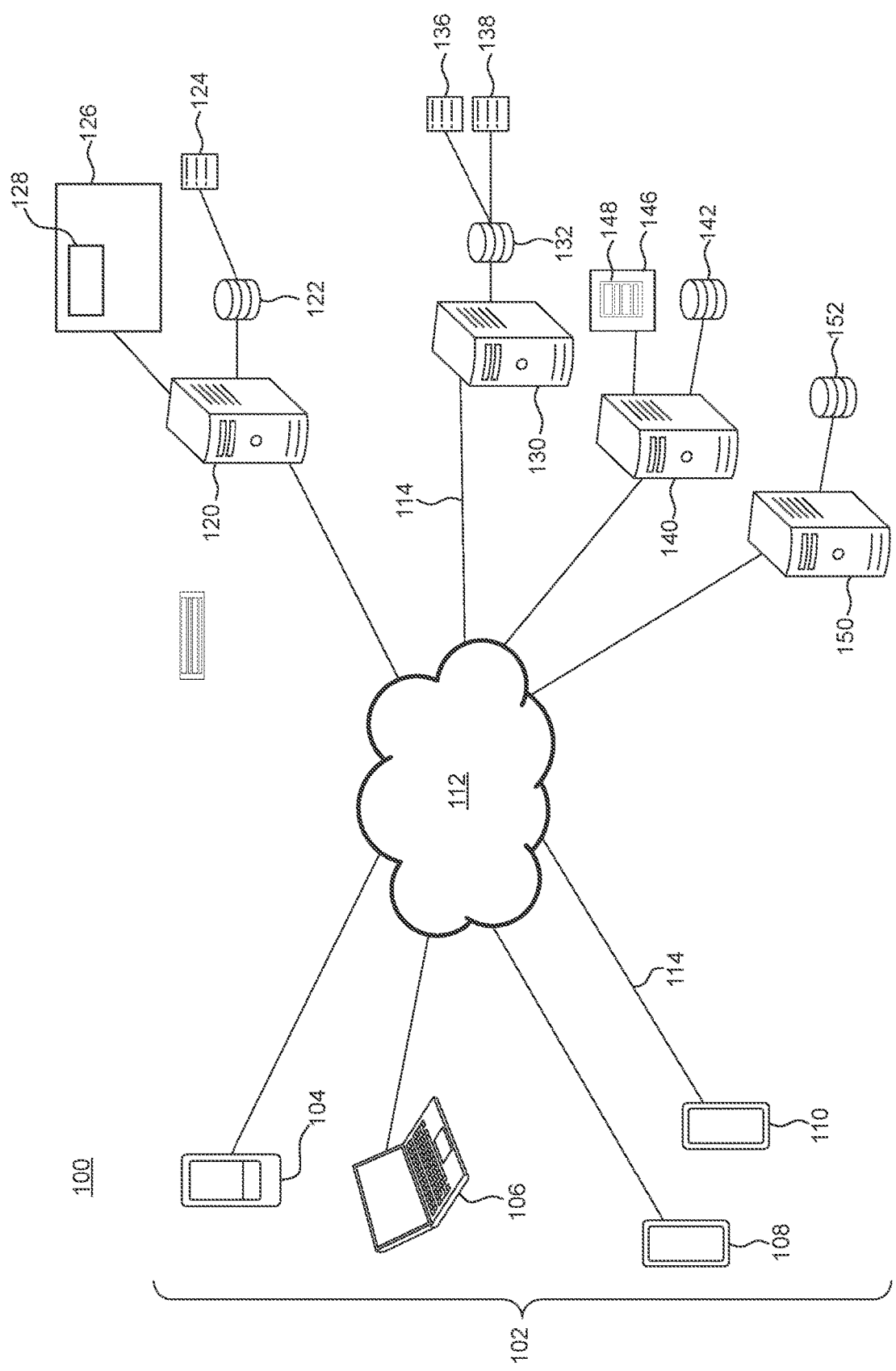
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

System

With reference to FIG. 1, there is depicted a system 100, the system 100 implemented according to non-limiting embodiments of the present technology. The system 100 comprises a plurality of client devices 102, the plurality of client devices 102 including a first client device 104, a second client device 106, a third client device 108, and a fourth client device 110 coupled to a communication network 112 via a respective communication link 114 (only one numbered in FIG. 1). The system 100 further comprises a search engine server 120, a tracking server 130, a social networking server 140 and a training server 150 coupled to the communication network 112 via their respective communication link 114.

Plurality of Client Devices

As an example only, the first client device 104 may be implemented as a smartphone, the second client device 106 may be implemented as a laptop, the third client device 108 may be implemented as a smartphone and the fourth client device 110 may be implemented as a tablet. In some non-limiting embodiments of the present technology, the communication network 112 can be implemented as the Internet. In other embodiments of the present technology, the communication network 112 can be implemented differently, such as any wide-area communications network, local-area communications network, a private communications network and the like.

How the given communication link 114 is implemented is not particularly limited and will depend on how the associated one of the first client device 104, the second client device 106, the third client device 108 and the fourth client device 110 are implemented. Merely as an example and not as a limitation, in those embodiments of the present technology where at least one of the first client device 104, the second client device 106, the third client device 108 and the fourth client device 110 is implemented as a wireless communication device (such as a smart-phone), the associated one of the communication link 114 can be implemented as a wireless communication link (such as but not limited to, a 3G communications network link, a 4G communications network link, a Wireless Fidelity, or WiFi® for short, Bluetooth® and the like). In those examples, where at least one of the first client device 104, the second client device 106, the third client device 108 and the fourth client device 110 are implemented respectively as laptop, smartphone, tablet computer, the associated communication link 114 can be either wireless (such as the Wireless Fidelity, or WiFi® for short, Bluetooth® or the like) or wired (such as an Ethernet based connection).

Generally speaking, each of the plurality of client devices 102 is associated with a respective user of a plurality of users (not depicted).

It should be expressly understood that implementations for the plurality of client devices 102 including the first client device 104, the second client device 106, the third client device 108, the fourth client device 110, the communication link 114 and the communication network 112 are provided for illustration purposes only. As such, those skilled in the art will easily appreciate other specific implementational details for the first client device 104, the second client device 106, the third client device 108, the fourth client device 110 and the communication link 114 and the communication network 112. As such, by no means, examples provided herein above are meant to limit the scope of the present technology.

While only four client devices 104, 106, 108 and 110 are illustrated (all are shown in FIG. 1), it is contemplated that any number of client devices in the plurality of client devices 102 could be connected to the system 100. It is further contemplated that in some implementations, the number of client devices in the plurality of client devices 102 included in the system 100 could number in the tens or hundreds of thousands.

Search Engine Server

Also coupled to the communication network 112 is the aforementioned search engine server 120. The search engine server 120 can be implemented as a conventional computer server. In an example of an embodiment of the present technology, the search engine server 120 can be implemented as a Dell™ PowerEdge™ Server running the Microsoft™ Windows Server™ operating system. Needless to say, the search engine server 120 can be implemented in any other suitable hardware and/or software and/or firmware or a combination thereof. In the depicted non-limiting embodiment of present technology, search engine server 120 is a single server. In alternative non-limiting embodiments of the present technology, the functionality of the search engine server 120 may be distributed and may be implemented via multiple servers. In some embodiments of the present technology, the search engine server 120 is under control and/or management of a search engine operator. Alternatively, the search engine server 120 can be under control and/or management of a service provider.

The search engine server 120 provides a search engine service 126 to the plurality of users (not depicted), the search engine service 126 being accessible by users via respective client devices of the plurality of client devices 102. The search engine service 126 may be accessible by typing a uniform resource locator (URL) in a browser application (not depicted) on a client device, or may be accessible on stand-alone software (such as a mobile application, for example)

The search engine server 120 maintains a search log database 122, the search log database 122 including an index 124.

Generally speaking, the purpose of the search engine server 120 is to: (i) discover and index documents available on the Web; (ii) execute searches in response to a given search query from a given user; (iii) execute analysis of documents and perform ranking of documents in response to the given search query; (iv) group the documents and compile the search engine result page (SERP) to be outputted to a client device (such as one of the first client device 104, the second client device 106, the third client device 108 and the fourth client device 110), the client device having been used to submit the given search query that resulted in the SERP.

How the search engine server 120 is configured to discover and index documents, execute searches, analysis and ranking of documents is not particularly limited. Those skilled in the art will appreciate several ways and means to implement the search engine server 120 and as such, several structural components of the search engine server 120 will only be described at a high level.

The search engine server 120 is configured to execute a document discovery procedure (not depicted), which is generally used by the search engine server 120 for discovering documents available over the communication network 112. For example, the search engine server 120 is configured to execute a "crawler" application that "visits" network resources available over the communication network 112 and downloads them for further processing.

The nature of documents that the search engine server 120 is configured to visit and download is not particularly limited but, for sake of illustration only, the documents described herein may be representative of web pages, images, PDFs, Word™ documents, PowerPoint™ documents that are available over the communication network 112.

The search engine server 120 may also be configured to execute an indexing procedure (not depicted), which is generally used by the search engine server 120 for building and/or maintaining indexing structures employed by the given search engine for performing searches. For example, the search engine server 120 is configured to build and/or maintain an inverted index, which will be referred to as the index 124.

How the index 124 is implemented in the present technology is not particularly limiting but, just as an example, the index 124 comprises a number of posting lists each on which is associated with a respective "searchable term". A given posting in a given posting list includes some type of data that is indicative of a given document that includes the searchable term associated with the given posting list and, optionally, includes some additional data (for example, where in the document the searchable term appears, number of appearances in the document, and the like). In summary, every posting list corresponds to a searchable term, and comprises a series of postings referencing each of the discovered documents that contain at least one occurrence of that respective searchable term (or a portion thereof).

It should be mentioned that additional data, such as features of the indexed documents, may also be found in a given posting; for example, the number of occurrences of a given searchable term in a given document; whether this search term occurs in the title of the given document, etc. Naturally, this additional data may be different depending on the given search engine and inter alia various implementations of the present technology.

Searchable terms are typically, but not exclusively, words or other character strings, images, and the like. A given search engine may typically deal with practically every word in a number of different languages, as well as proper names, numbers, symbols, etc. A very commonly used word may have a posting list of as many as one billion postings (or even more).

The search engine server 120 may also be configured to execute a querying procedure (not depicted), which is generally used by the search engine server 120 for identifying documents that may contain some part of a given query submitted to the given search engine. For example, when a given query (such as a current query of a user of the first client device 104, for example) is received by the search engine server 120, the search engine server 120 may parse the given query into a plurality of searchable terms. The search engine server 120 may then access the index 124 and identify posting lists that are associated with at least one of the plurality of searchable terms. As a result, the search engine server 120 may access at least some postings in the so-identified posting lists and identify at least some documents that may contain at least some of the plurality of searchable terms of the given query.

The search engine server 120 is configured to execute ranking of the identified documents in the index 124 that contain at least some of the plurality of searchable terms of the given query.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 120 can thus calculate and assign a relevance score (based on the different criteria listed above) to each search result obtained in response to a user-submitted search query and generate a SERP, where search results are ranked according to their respective relevance scores. It is contemplated that ranking of documents as search results may be executed in more than one step.

In the embodiment illustrated herein, the search engine server 120 executes a plurality of machine learning algorithms (MLAs) 128, which will be referred to as the MLA 128. The MLA 128 may be used as a non-limiting example for ranking documents in response to a query, classifying queries, and classifying documents.

As another non-limiting example, the MLA 128 may have been trained to classify documents as including sensitive content or not based on features thereof.

In some embodiments of the present technology, the search engine server 120 can execute ranking for several types of searches, including but not limited to, a general search and a vertical search.

Tracking Server

Also coupled to the communication network 112 is the above-mentioned tracking server 130. The tracking server 130 can be implemented as a conventional computer server. In an example of an embodiment of the present technology, the tracking server 130 can be implemented as a Dell™ PowerEdge™ Server running the Microsoft™ Windows Server™ operating system. Needless to say, the tracking server 130 can be implemented in any other suitable hardware and/or software and/or firmware or a combination thereof. In the depicted non-limiting embodiment of present technology, the tracking server 130 is a single server. In alternative non-limiting embodiments of the present technology, the functionality of the tracking server 130 may be distributed and may be implemented via multiple servers. In other embodiments, the functionality of the tracking server 130 may be performed completely or in part by the search engine server 120. In some embodiments of the present technology, the tracking server 130 is under control and/or management of a search engine operator. Alternatively, the tracking server 130 can be under control and/or management of another service provider.

Generally speaking, the tracking server 130 is configured to track user interactions with the search engine service 126. The user interactions may be requests in a form of search queries submitted on the search engine service 126, as well as search results provided by the search engine server 120 in response to the submitted queries (e.g. made by users of one of the first client device 104, the second client device 106, the third client device 108 and the fourth client device 110). The tracking server 130 may track user interactions (such as, for example, click-through data) when users perform general web searches and vertical web searches on the search engine service 126, and store the user interactions in a tracking database 132.

The tracking server 130 may also be configured to automatically determine user interactions parameters based on tracked user interactions with search results. As a non-limiting example, the tracking server 130 may compute a click-through rate (CTR), at predetermined intervals of time or upon receiving an indication, based on a number of clicks on an element and number of times the element was shown (impressions) in a SERP.

Non-limiting examples of user interactions tracked by the tracking server 130 include:
  Loss/Win: was the document clicked in response to the search query or not.
  Views: how many times the document was shown.
  Dwell time: time a user spends on a document before returning to the SERP.
  Long/short click: was the user interaction with the document long or short, compared to the user interaction with other documents on the SERP.

Naturally, the above list is non-exhaustive and may include other types of user interactions without departing from the scope of the present technology. In some embodiments, the tracking server 130 may compile user interaction data (which may, as a non-limiting example, include user interactions for every hour) and generate user interaction parameters to be stored in the tracking database 132 in a suitable format for implementing the present technology (which, may be, as a non-limiting example, user interaction parameters featuring a number of user interactions every hour for a predetermined period of time of 3 months). In other embodiments, the tracking server 130 may store the user interaction data in a raw form in the tracking database 132, such that it can be retrieved and compiled by at least one of the search engine server 120, the training server 150, or another server (not depicted) in a suitable format for implementing the present technology.

The tracking server 130 typically maintains the above-mentioned tracking database 132, the tracking database 132 including a query log 136 and a user interaction log 138.

The purpose of the query log 136 is to log searches that were made using the search engine server 120. More specifically, the query log 136 maintains terms of search queries (i.e. the associated search words) and the associated search results (or an indication thereof). It is noted that the query log 136 can be maintained in an anonymized manner—i.e. search queries are not trackable to the users who have submitted the search query.

More specifically, the query log 136 may include a list of queries with their respective terms, with information about documents that were listed by the search engine server 120 in response to a respective query, a timestamp, and may also contain a list of users identified by anonymous IDs (or without an ID altogether) and the respective documents they have clicked on after submitting a query. In some embodiments, the query log 136 may be updated every time a new search is performed on the search engine server 120. In other embodiments, the query log 136 may be updated at predetermined intervals of time. In some embodiments, there may be a plurality of copies of the query log 136, each corresponding to the query log 136 at different points in time.

The user interaction log 138 may be linked to the query log 136, and list user interactions as tracked by the tracking server 130 after a user has submitted a query and clicked on one or more documents on a SERP on the search engine server 120. As a non-limiting example, the user interaction log 138 may contain a reference to a document, which may be identified by an ID number or an URL, a list of queries, where each query of the list of queries has been used to access the document, and respective user interactions associated with the document for the respective query of the list of queries (if the document was interacted with), which will be described in more detail herein below. The plurality of user interactions may generally be tracked and compiled by the tracking server 130, and in some embodiments may be listed for each individual user.

In some embodiments, the tracking server 130 may send tracked queries, search result and user interactions to the search engine server 120, which may store the tracked queries, user interactions and associated search results in the search log database 122. In alternative non-limiting embodiments of the present technology, the functionality of the tracking server 130 and the search engine server 120 can be implemented by a single server.

Social Networking Server

Also coupled to the communications network is the above-mentioned social networking server 140. The social networking server 140 can be implemented as a conventional computer server. In an example of an embodiment of the present technology, the social networking server 140 can be implemented as a Dell™ PowerEdge™ Server running the Microsoft™ Windows Server™ operating system. Needless to say, the social networking server 140 can be implemented in any other suitable hardware and/or software and/or firmware or a combination thereof. In the depicted non-limiting embodiment of present technology, the social networking server 140 is a single server. In alternative non-limiting embodiments of the present technology, the functionality of the social networking server 140 may be distributed and may be implemented via multiple servers.

Generally speaking, the social networking server 140 is configured to host a social networking service 146, the social networking service 146 including inter alia a plurality of content items 148 submitted via at least a portion of the plurality of client devices 102 by respective users of a plurality of users (not depicted).

The nature and type of each of the plurality of content items 148 is not limited, and may include text, images, videos, games, digital files or a combination thereof. In some embodiments, the social networking service 146 may be a topical social network, i.e. discussing a specific topic or event, or may be divided into topical social networks.

The social networking server 140 may maintain a social networking database 142 for storing inter alia the plurality of content items 148, user profiles, digital files, and/or other information associated with the social networking service 146.

The social networking server 140 may provide an application programming interface (API) for acquiring data from the social networking service 146 by users. Generally speaking, the API allows developers to query the social networking service 146 for content items, users, channels, demographic data, and the like.

Training Server

Also coupled to the communications network is the above-mentioned training server 150. The training server 150 can be implemented as a conventional computer server. In an example of an embodiment of the present technology, the training server 150 can be implemented as a Dell™ PowerEdge™ Server running the Microsoft™ Windows Server™ operating system. Needless to say, the training server 150 can be implemented in any other suitable hardware and/or software and/or firmware or a combination thereof. In the depicted non-limiting embodiment of present technology, the training server 150 is a single server. In alternative non-limiting embodiments of the present technology, the functionality of the training server 150 may be distributed and may be implemented via multiple servers. In the context of the present technology, the training server 150 may implement in part the methods and system described herein. In some embodiments of the present technology, the training server 150 is under control and/or management of a search engine operator. Alternatively, the training server 150 can be under control and/or management of another service provider.

Generally speaking, the training server 150 is configured to train a plurality of MLAs (including the MLA 128) used by the search engine server 120, the tracking server 130 and/or other servers (not depicted) associated with the search engine operator.

The training server 150 may, as an example, train one or more MLAs associated with the search engine provider for optimizing general web searches, vertical web searches, providing recommendations, predicting outcomes, classifying queries, documents, and users, and other applications. The training and optimization of the MLAs may be executed at predetermined intervals of time, or when deemed necessary by the search engine provider.

In the context of the non-limiting embodiments of the present technology, the training server 150 is configured to: (i) monitor search queries having been submitted via at least a portion of the plurality of client devices 102 on the search engine service 126, the search queries being associated with documents provided in response thereto; (ii) monitor content items having been submitted via at least a portion of the plurality of client devices 102 on the social networking service 146; (iii) determine that one or more documents associated with a content item on the social networking service 146 and provided by the search engine service 126 in response to a given search query has been misclassified by the MLA 128 executed by the search engine server 120; (iv) generate a set of training objects based on the misclassified documents; and (iv) retrain the MLA 128 based on the set of training objects. How the training server 150 is configured to do so will be explained in more detail herein below.

The training server 150 may maintain a training database 152 for storing training objects (not depicted) and/or other information that may used by the search engine server 120, the tracking server 130 and/or other servers (not depicted) associated with the search engine operator.

Figure 2:
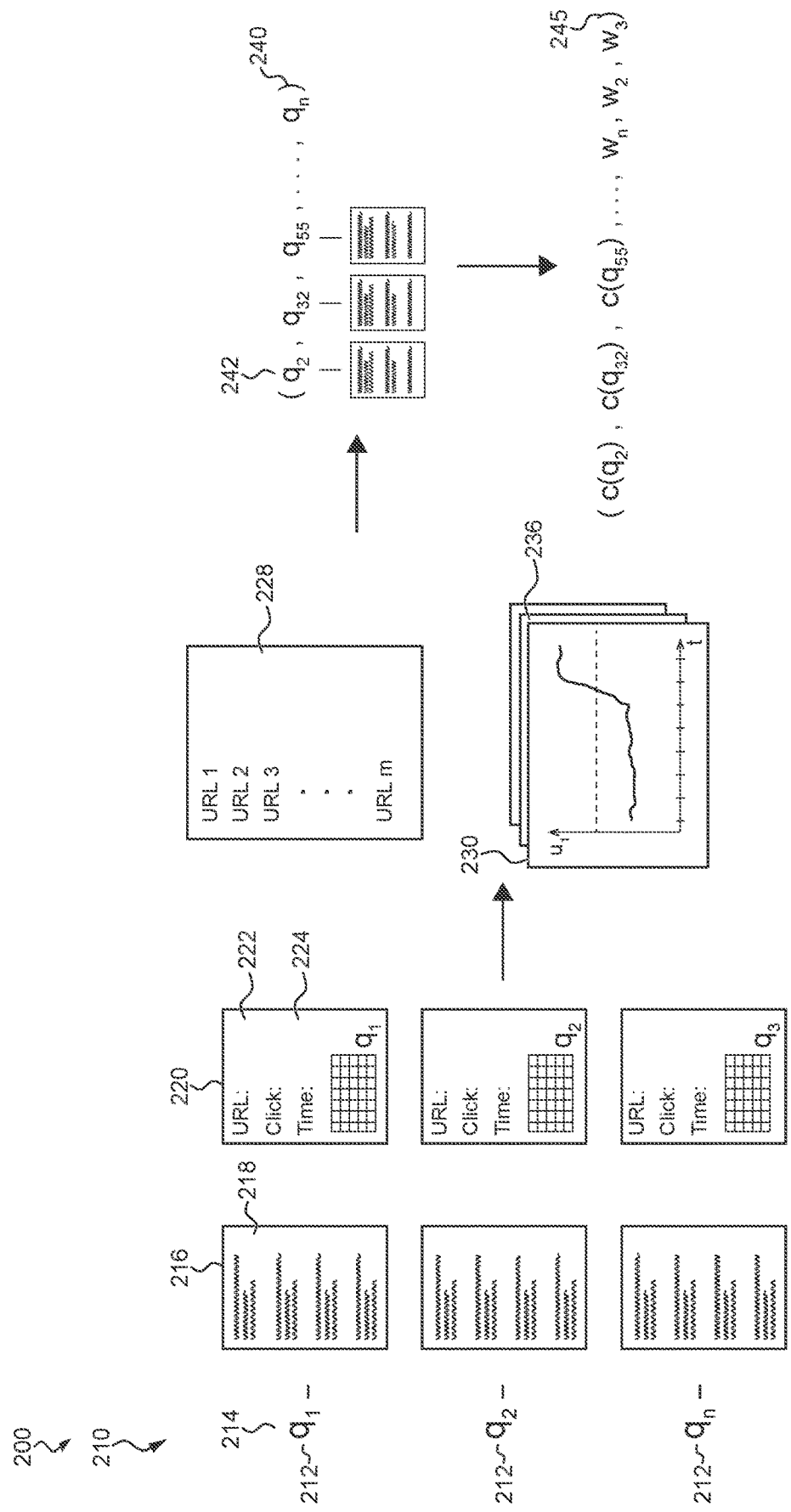
FIGS. 2 and 3 depict a schematic diagram of a monitoring procedure in accordance with non-limiting embodiments of the present technology.
Figure 3:
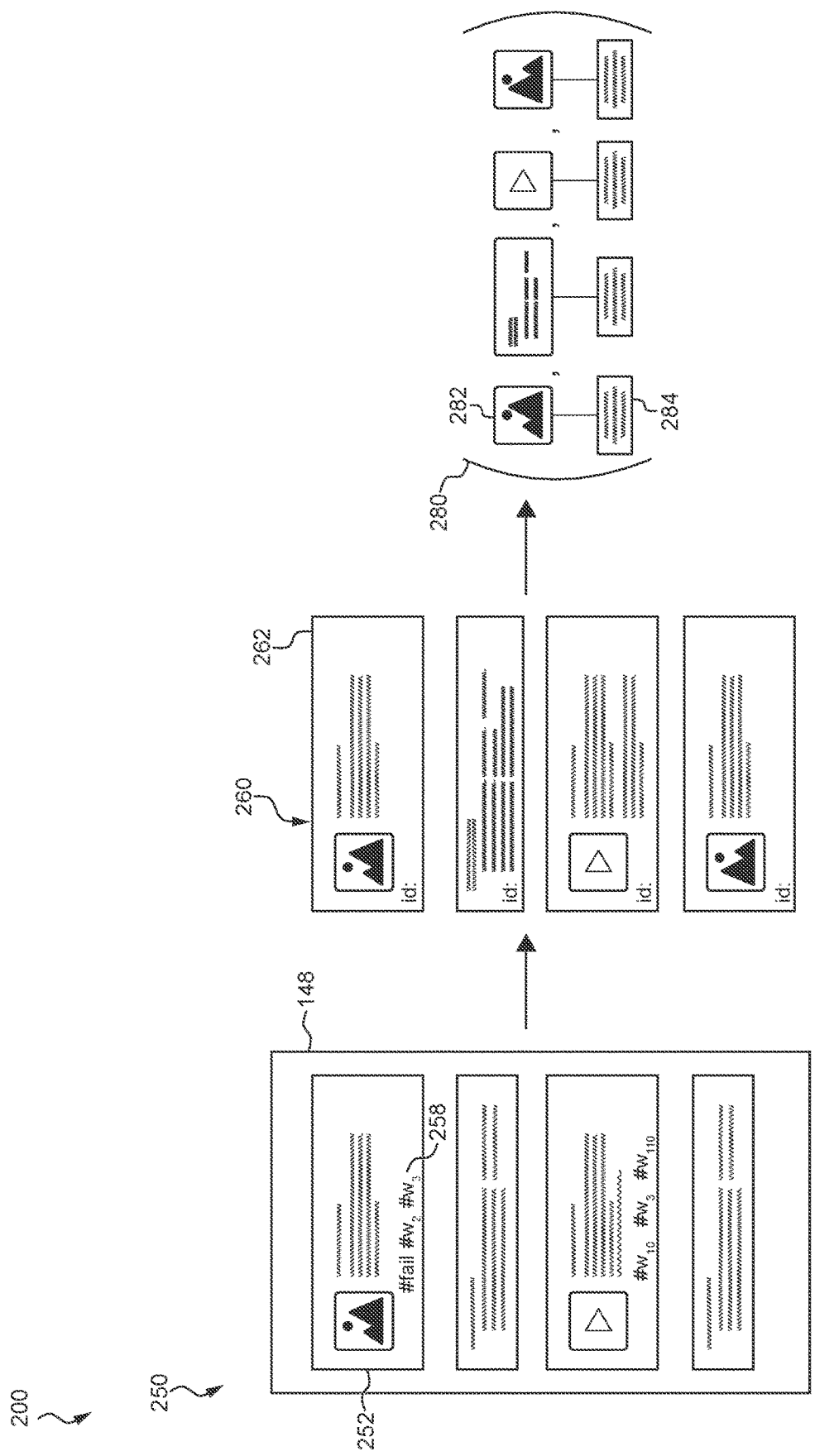

Now turning to FIGS. 2 and 3, there is illustrated a schematic diagram of a monitoring procedure 200 in accordance with non-limiting embodiments of the present technology.

Monitoring Procedure

The monitoring procedure 200 is executed by the training server 150.

In some embodiments of the present technology, the monitoring procedure 200 may be executed by at least one of the tracking server 130 and the training server 150. In other embodiments of the present technology, the monitoring procedure 200 may be executed by more servers (not depicted).

The monitoring procedure 200 includes a search engine monitoring procedure 210, and a social networking monitoring procedure 250.

Generally speaking, the purpose of the monitoring procedure 200 is to track user interactions performed by the plurality of users (not depicted) on the search engine service 126 by executing the search engine monitoring procedure 210, and track content posted by the plurality of users (not depicted) on the social networking service 146 to detect documents mentioned on the social networking service 146 and referenced by the search engine service 126 that may have been potentially misclassified by the MLA 128. Thus, it can be said that signals from the social networking service 146 and the search engine service 126 are "cross-referenced" and used to detect potentially misclassified documents.

A given document may be misclassified by the MLA 128 due to a variety of reasons, such as "grey-area" document features, i.e. features that may share characteristics with two or more classes, or because the MLA has never "seen" similar document features during training. On the search engine service 126, a given document being misclassified by the MLA 128 may be indicative of a non-responsiveness of the document as a search result to a search query, or the document being non-suitable for the search query. A given document being misclassified by the MLA 128 may be indicative of the document being non-appropriate to a mode of operation of a web browser used by a user submitting the search query, such as web browser operating in parental control mode to restrict sensitive content.

As has been alluded to above, the monitoring procedure 200 includes the search engine monitoring procedure 210, and the social networking monitoring procedure 250.

Search Engine Monitoring Procedure

The search engine monitoring procedure 210 is generally executed by the training server 150. The search engine monitoring procedure 210 may be executed in an offline mode, by accessing information tracked in the tracking database 132. It is contemplated that in alternative embodiments of the present technology, the search engine monitoring procedure 210 may be executed by the tracking server 130. It should be noted that the search engine monitoring procedure 210 may also be executed in a distributed manner or in part by at least one of the search engine server 120, the tracking server 130, the training server 150, and/or other servers (not depicted).

The purpose of the search engine monitoring procedure 210 is to monitor user interactions performed by at least a portion of users via the plurality of client devices 102 on the search engine service 126 to detect "fluctuations" in user interactions.

In the context of the search engine monitoring procedure 210, "fluctuations" in user interactions denotes any irregular variation of the value of user interaction data. It should be noted that "regular" and "irregular" variations of numerical values for a given user interaction may be determined based on a statistical analysis of past user interactions, and/or may be determined by operators of the present technology. In some embodiments of the present technology, the fluctuations may be determined based on a predetermined threshold, which may be absolute or relative. Additionally, the fluctuations may be determined based on a predetermined threshold during a predetermined period of time. Factors such as position of a document, presence of news items relating to a query, date of creation, date of modification, and other factors may also be considered.

Non-limiting examples of irregular user interactions include a sudden increase of a number of queries submissions for a given query, e.g. a 20% increase in query submissions for the given query during a period of one hour, an increase in a number of clicks by users on a document provided in response to another given query, e.g. a document provided in response to a given query receives an unusual amount of clicks, or e.g. a document ranked at the 30$^{th}$ position in response to a query receives more clicks than a document ranked at the 1$^{st}$ position in response to the query, which may be considered unusual for that query.

The search engine monitoring procedure 210 acquires, from the query log 136, a plurality of queries 212, where each respective query 214 is associated with a respective set of documents 216 having been presented as search results in a search engine results page (SERP) on the search engine server 120 to a respective portion of the plurality of users (not depicted). In some embodiments of the present technology, the respective set of documents 216 may be an indication of each document provided as a search result in response to the respective query 214.

The search engine monitoring procedure 210 acquires, from the query log 136 and the user interaction log 138, for each respective query 214 of the plurality of queries 212, respective traffic information 220.

Generally speaking, the respective traffic information 220 includes respective user interaction data 222 related to the respective query 214.

In some embodiments of the present technology, the respective user interaction data 222 for each respective query 214 includes user interaction data with one or more respective documents 218 of the respective set of documents 216. The respective user interaction data 222 may include, as a non-limiting example, a number of clicks, a click-through ratio, and a dwell time.

In some embodiments of the present technology, the respective traffic information 220 further includes a respective traffic source 224.

The respective traffic source 224 may be a uniform resource locator (URL) of a previous resource having been accessed by a given user of the plurality of users (not depicted) before entering a given query of the plurality of queries 212 on the search engine service 126. As a non-limiting example, the respective traffic source 224 may be a given content item posted by a given user on the social networking service 146. In some embodiments of the present technology, a given user may access the search engine service 126 upon opening a browser application (not depicted), and the respective traffic source 224 may be null. In some embodiments of the present technology, the respective traffic source 224 may include an indication of a software, such as a mobile application, e.g., a user may have accessed the search engine service 126 via a mobile application associated with the social networking service 146.

In some embodiments of the present technology, in instances where user interaction data is not aggregated in the query log 136 and/or the user interaction log 138, i.e. when user interaction data is listed in raw form, the search engine monitoring procedure 210 may determine, for each respective query 214 of the plurality of queries 212, based on the respective traffic information 220, one or more respective user interaction parameters.

As a non-limiting example, in instances where the query log 136 lists, for each user ID, a submitted query, documents presented as search results in response to the submitted query, and a timestamp, the search engine monitoring procedure 210 acquires all instances of a given query for a specific period of time, such as one week, and determines the user-interaction parameter, which indicates a number of submissions for every hour during the period of one week.

Filtering of the Plurality of Queries

The search engine monitoring procedure 210 filters the plurality of queries 212 based on the respective traffic information 220 to determine a set of queries 240, the set of queries 240 including at least one respective query 214 of the plurality of queries 212. The at least one respective query 214 in the set of queries 240 is associated with a respective set of documents 216 that includes a potentially misclassified document.

The search engine monitoring procedure 210 filters the plurality of queries 212 based on the respective traffic source 224. Generally speaking, the purpose of filtering the plurality of queries 212 based on the respective traffic source 224 is to select queries and/or documents provided in response to queries that originate from a traffic source that may be at the origin of the fluctuations in user interactions on the search engine service 126. It is contemplated that the respective traffic source 224 may be the social networking service 146. In some embodiments of the present technology, the search engine monitoring procedure 210 may be executed to identify traffic sources, such as the social networking service 146, which may be at the origin of the fluctuations in user interactions on the search engine service 126, and which may be indicative of misclassified documents on the search engine service 126.

In some non-limiting embodiments of the present technology, the search engine monitoring procedure 210 filters the plurality of queries 212 based on the respective traffic source 224 being one of a predetermined list of traffic sources 228. The predetermined list of traffic sources 228 may be determined by operators of the present technology, and include social networking services, personal blogs, and other types of resources.

As a non-limiting example, the predetermined list of traffic sources 228 may include social networking services such as Facebook™, VKontakte™, Twitter™, Reddit™, Instagram™, Pinterest™, YouTube™, personal blogging platforms such as WordPress™, Tumblr™, Medium™, and messaging platforms such as Viber™, and WhatsApp™.

The search engine monitoring procedure 210 filters the plurality of queries 212 based on the respective user interaction parameters 230. In some embodiments of the present technology, the search engine monitoring procedure 210 filters the plurality of queries 212 based on the respective user interaction parameters 230 being above a predetermined threshold 236. The predetermined threshold 236 may be defined over a predetermined period of time.

In some non-limiting embodiments of the present technology, the respective user interaction parameter 230 may be a number of search query submissions. It is contemplated that the respective predetermined threshold 236 and/or the respective predetermined period of time may be determined based on the respective traffic source 224.

In other non-limiting embodiments of the present technology, the search engine monitoring procedure 210 may sort the plurality of queries 212 based on the respective user interaction parameters 230, and select a predetermined number of queries having highest respective user interaction parameters 230. As a non-limiting example, the search engine monitoring procedure 210 may sort the plurality of queries 212 based on a number of submissions on the search engine service 126, and select the top 10 queries to be part of the set of queries 240.

Additionally, in some embodiments of the present technology, the search engine monitoring procedure 210 filters the plurality of queries 212 based on the respective user interaction parameter (not depicted) associated with a document of the respective set of documents 216. The search engine monitoring procedure 210 filters the plurality of queries 212 based on the respective user interaction parameter (not depicted) with the respective document 218 of the respective set of documents 216 being above a predetermined threshold, the respective set of documents 216 having been provided in response to a given query of the plurality of queries 212.

It is contemplated that in some non-limiting embodiments of the present technology, the filtering of the plurality of queries 212 may be executed during acquisition of the plurality of queries 212 from the query log 136, i.e. by specifying conditions such as: acquire only queries from a respective traffic source 224 part of the predetermined list of traffic sources 228, acquire only queries having a number of submissions over a predetermined threshold, and the like.

The search engine monitoring procedure 210 outputs the set of queries 240, the set of queries 240 including at least one respective query 242 associated with a respective set of documents 244 having been presented as search results in response to the respective query 242. The set of queries 240 includes queries associated with fluctuations in user interactions, which may be indicative that a respective query 242 is associated with a potentially misclassified document (not depicted) in the respective set of documents 216.

Set of Content Features

The search engine monitoring procedure 210 extracts a set of content features 245 for the set of queries 240. The purpose of extracting the set of content features 245 is to allow, during execution of the social networking monitoring procedure 250, identification of documents having been potentially misclassified by the MLA 128 of the search engine service 126.

Generally speaking, the set of content features 245 is indicative of content of the respective query 214 leading to the respective potentially misclassified document.

As a non-limiting example, the set of content features 245 may include the respective query 214 and variations thereof, as well as queries that may have been determined to be similar to the respective query 214, as an example by determining a similarity parameter based on search results similarity or semantic similarity, as described in a Russian Federation Patent Application No. 2018122689 entitled "METHOD OF AND SYSTEM FOR RANKING SEARCH RESULTS USING MACHINE LEARNING ALGORITHM", and filed on Jun. 21, 2018, content of which is incorporated herein by reference in its entirety and, therefore, will not be described in greater detail herein.

In some non-limiting embodiments of the present technology, the set of content features 245 includes an indication of at least one document of the respective set of documents 216 associated with the respective query 214. The indication of the at least one respective document 218 may be, as a non-limiting example, a title of the document or variations thereof, or at least a portion of a content of the respective document 218.

Additionally, the set of content features 245 may include a plurality of predetermined words associated with a fluctuation in user interactions of the set of queries 240. As a non-limiting example, the plurality of predetermined words may include words such as: wow, funny, unbelievable, fail, failure, ridiculous, stupid, a name of the search engine service 126, or any other word or phrase that may associated with viral content for example.

The search engine monitoring procedure 210 outputs the set of content features 245. In some non-limiting embodiments of the present technology, the set of content features 245 may be stored in the training database 152.

Social Networking Monitoring Procedure

The social networking monitoring procedure 250 is executed by the tracking server 130.

The social networking monitoring procedure 250 is executed after the search engine monitoring procedure 210. It is contemplated that in alternative non-limiting embodiments of the present technology, the social networking monitoring procedure 250 may be executed before the search engine monitoring procedure 210, or concurrently with the search engine monitoring procedure 210, i.e. to see if documents associated with content items have fluctuations in user interactions on the search engine server 120. In some non-limiting embodiments of the present technology, the social networking monitoring procedure 250 may be executed in parallel or sequentially for a plurality of social networking services (not depicted).

Generally speaking, the purpose of the social networking monitoring procedure 250 is to detect, on the social networking service 146, documents having been potentially misclassified by the MLA 128 on the search engine service 126. To achieve that purpose, the social networking monitoring procedure 250 accesses the resource associated with the social networking service 146 to track information, or acquires the information via an application programming interface (API) provided by the social networking service 146.

The social networking monitoring procedure 250 acquires at least a portion of the plurality of content items 148 on the social networking service 146.

As stated herein above, the social networking service 146 has the plurality of content items 148, which have been submitted by users of the social networking service 146 via their respective client devices, such as the plurality of client devices 102. Each content item 252 of the plurality of content items 148 may include documents such as text, images, music, videos, hyperlinks, digital files or a combination thereof. It should be understood that documents, as used herein, refer to any digital file that may have been referenced on the search engine server 120 and classified by the MLA 128.

It is contemplated that in some embodiments of the present technology, a given content item 252 of the plurality of content items 148 may include respective metadata 258 describing content or a theme of the given content item 252. The respective metadata 258 may be one or more metadata tags for example, which may be determined by a creator or viewer of the given content item 252, or may be automatically generated on the social networking service 146. As a non-limiting example, metadata tags for a content item including an image may have hashtags such as: # image, # funny, #2019, # fail, # StupidAI.

The social networking monitoring procedure 250 analyzes, based on the set of content features 245, at least a portion of the plurality of content items 148 on the social networking service 146 to identify a set of identified content items 260, which may include potentially misclassified documents.

In other non-limiting embodiments of the present technology, the social networking monitoring procedure 250 may analyze a portion of the plurality of content items 148, where the portion of the plurality of content items 148 corresponds to content items having been submitted on the social networking service 146 during a predetermined period of time. Additionally or alternatively, the social networking monitoring procedure 250 may analyze the portion of the plurality of content items 148 that respect a set of conditions (not depicted). The set of conditions (not depicted) may include conditions such as specific time period, specific type of content, specific demographic group, specific metadata, and specific users, discussion groups or companies for example. As a non-limiting example, the set of conditions may specify to retrieve: all content items that contain English language text, at least one metadata tag, and at least one image. In some embodiments of the present technology, the set of conditions may be included in the set of content features 245.

It is contemplated that in some non-limiting embodiments of the present technology, the set of conditions may include predetermined thresholds based on the respective traffic source 224. As a non-limiting example, the set of conditions may include thresholds based on the number of times a given content item 252 has been reposted, a number of "likes" a given content item has received, a number of comments a given content item has received, and the like. It should be noted that the set of conditions may be determined during the search engine monitoring procedure 210 and/or the social networking monitoring procedure 250.

The social networking monitoring procedure 250 identifies, in each identified content item 262 of the set of identified content items 260, at least a portion of at least one potentially misclassified document 282. It should be noted that the identified content item 262 may include more than one misclassified document, for example when a user publishes a photo album which includes a plurality of photos being potentially misclassified documents. Additionally, the identified content item 262 may contain only a portion of a potentially misclassified document 282, such as a portion of a text or an image for example, which may be referenced on the search engine service 126. The social networking monitoring procedure 250 forms the set of potentially misclassified documents 280.

As a non-limiting example, if a content item contains a text, and an image that is a screenshot of a SERP showing only a portion of a document, such as another image, that has been potentially misclassified by the MLA 128, the social networking monitoring procedure 250 may extract the screenshot and/or portion of the other image that has been potentially misclassified by the MLA 128. The portion of at least one potentially misclassified document 282 may be identified and extracted by a MLA (not depicted) having been trained for the task, e.g. the MLA may have been trained to recognize a document and a title of the search engine service 126 in a screenshot of a browser application.

Generally speaking, each potentially misclassified document 282 is associated with respective document information 284. The respective document information 284 includes an indication of the respective identified content item 262 from which it has been extracted (not depicted), as well as features from the set of content features 245 having been used to identify the respective identified content item 262 of the plurality of content items 148, such as the query having been used to access the potentially misclassified document 282 on the search engine service 126.

Figure 4:
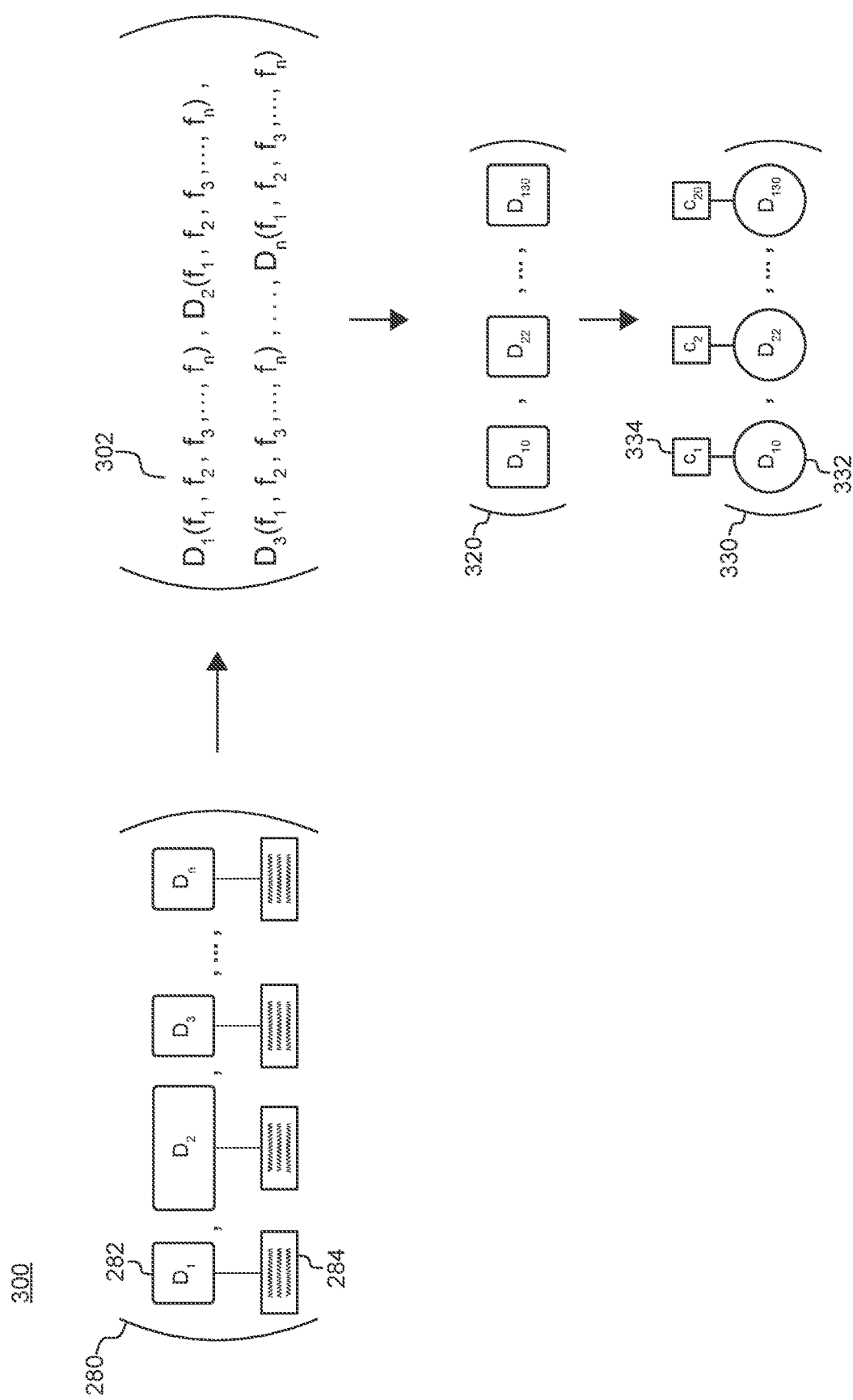
FIG. 4 depicts a schematic diagram of a document misclassification determination procedure in accordance with non-limiting embodiments of the present technology.

Now turning to FIG. 4, there is depicted a schematic diagram of a document misclassification determination procedure 300 in accordance with non-limiting embodiments of the present technology.

The document misclassification determination procedure 300 is executed at least partially by the training server 150. In some embodiments of the present technology, the training server 150 may access an MLA (not depicted) to execute at least a portion of the document misclassification determination procedure 300.

Generally speaking, the purpose of the document misclassification determination procedure 300 is to determine if the MLA 128 has misclassified documents in the set of potentially misclassified documents 280, the set of potentially misclassified documents 280 having been identified during the social networking monitoring procedure 250. To achieve that purpose, the document misclassification determination procedure 300 is configured to: (i) identify, in the search log database 122, each potentially misclassified document 282 of the set of potentially misclassified documents 280; (ii) acquire a respective set of document features 302 of each potentially misclassified document 282 of the set of potentially misclassified documents 280; (iii) analyze each potentially misclassified document 282 of the set of potentially misclassified documents 280 based on the respective set of document features 302 to determine if they have been misclassified to obtain a subset of misclassified documents 320.

The document misclassification determination procedure 300, identifies, based on the respective document information 284 of each potentially misclassified document 282 of the set of potentially misclassified documents 280, the potentially misclassified document 282 in the index 124.

The document misclassification determination procedure 300 acquires the respective set of document features 302 of the potentially misclassified document 282, the respective set of document features 302 having been used to classify the potentially misclassified document 282 by the MLA 128.

In some non-limiting embodiments of the present technology, the document misclassification determination procedure 300 acquires the respective set of document features 302 of the potentially misclassified document 282 from a database, such as the search log database 122 for example. In other non-limiting embodiments of the present technology, as an example when the respective set of document features 302 have not been stored, the document misclassification determination procedure 300 may extract the respective set of document features 302 of the potentially misclassified document 282. The document misclassification determination procedure 300 may access the MLA 128 to extract the respective set of document features 302.

In some non-limiting embodiments of the present technology, the document misclassification determination procedure 300 may acquire, from a database such as the training database 152 or by executing the MLA 128, a respective probability associated with a classification of each of the potentially misclassified document 282. As a non-limiting example, one or more documents in the set of potentially misclassified documents 280 may be associated with lower probabilities to belong to the class in which they have been misclassified.

In some non-limiting embodiments of the present technology, the set of potentially misclassified documents 280 may be submitted to one or more human assessors, such that misclassified documents in the set of potentially misclassified documents 280 may be analyzed by the one or more human assessors to determine if they have been misclassified, as well as the respective class they should belong to. Additionally or alternatively, the set of potentially misclassified documents 280 may be analyzed by another MLA, which may have been trained differently for the same task.

The document misclassification determination procedure 300 determines, from the set of potentially misclassified documents 280, a subset of misclassified documents 320. The subset of misclassified documents 320 includes at least one misclassified document 322.

In some embodiments of the present technology, each misclassified document 322 in the subset of misclassified documents 320 may include the respective set of document features 302.

The document misclassification determination procedure 300 generates a set of training objects 330, each training object 332 including a label of a respective corrected class 334. The document misclassification determination procedure 300 stores the set of training objects 330 in the training database 152.

Figure 5:
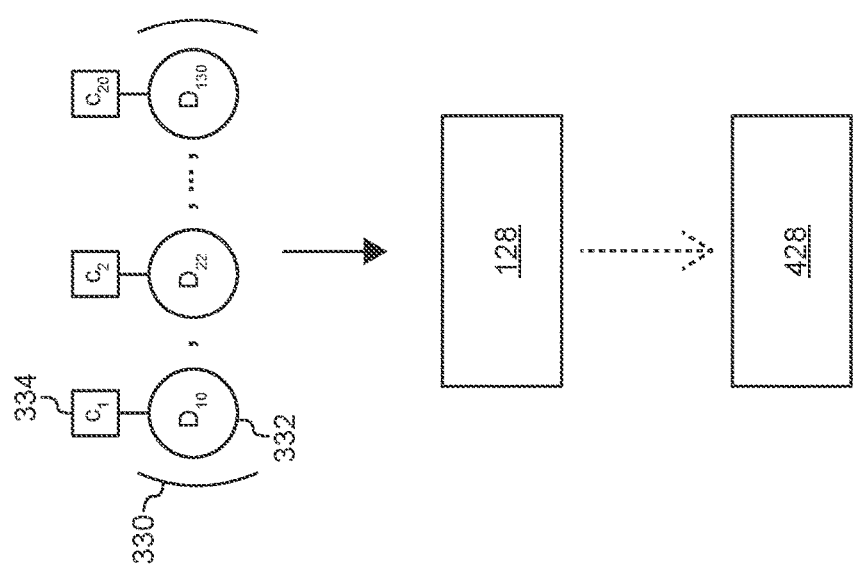
FIG. 5 depicts a schematic diagram of a retraining procedure in accordance with non-limiting embodiments of the present technology.

With reference to FIG. 5, there is depicted a schematic diagram of a retraining procedure 400 in accordance with non-limiting embodiments of the present technology.

Retraining Procedure

The retraining procedure 400 is executed by the training server 150.

Generally speaking, the purpose of the retraining procedure 400 is to retrain the MLA 128 to classify objects similar to the set of training objects 330, which are "grey-area" objects in terms of their features for the MLA 128. The retraining procedure 400 may be executed at predetermined intervals of time. Additionally or alternatively, the retraining procedure 400 may be executed only when a number of training objects in the set of training objects 330 is above a predetermined number.

The retraining procedure 400 retrains the MLA 128 on at least a first portion of the set of training objects 330 as well as the original training objects having been used to train the MLA 128. The retraining procedure 400 retrains the MLA 128 based on the same set of document features, or on new document features (which may be determined at least partially by operators of the present technology, or determined by the MLA 128).

The retraining procedure 400 then validates the retrained MLA 428 on a second portion of the set of training objects 330.

Figure 6:
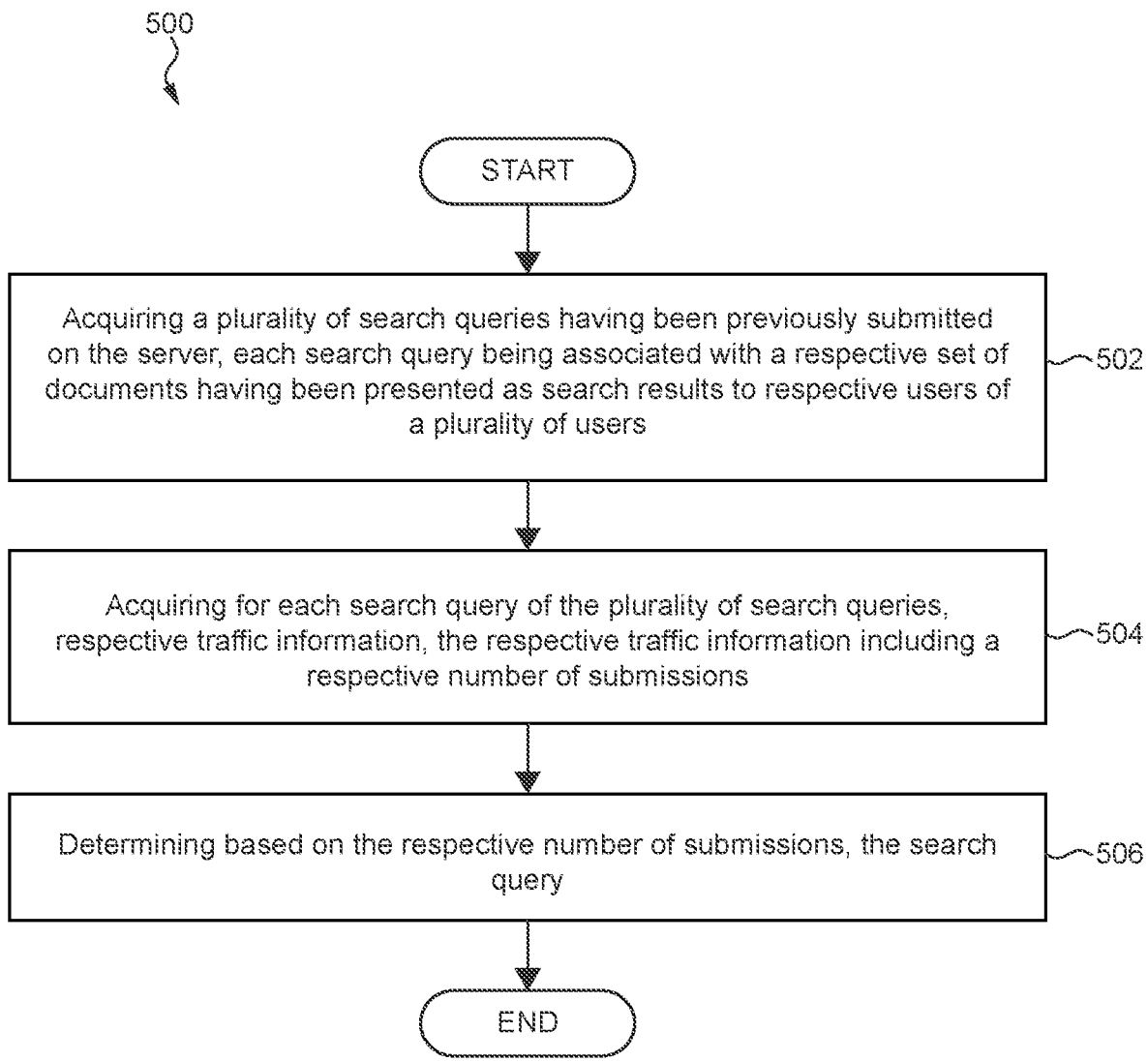
FIG. 6 depicts a block diagram of a method of determining a search query leading to a potentially misclassified document, the method executable within the system of FIG. 1 in accordance with non-limiting embodiments of the present technology.

FIG. 6 depicts a flowchart of a method 500 of determining a search query leading to a potentially misclassified document, the method 500 being executed according to non-limiting embodiments of the present technology.

The method 500 is executed by the training server 150. The training server 150 comprises a processor, and non-transitory computer-readable medium comprising instructions. The processor, upon executing the instructions, is configured to execute the method 500.

The method 500 begins at step 502.

STEP 502: acquiring a plurality of search queries having been previously submitted on the server, each search query being associated with a respective set of documents having been presented as search results to respective users of a plurality of users At step 502, the training server 150 acquires, by executing the search engine monitoring procedure 210, the plurality of queries 212 having been previously submitted on the search engine service 126 of the search engine server 120, each respective query 214 being associated with a respective set of documents 216 having been presented as search results on respective client devices of the plurality of client devices 102 to respective users of a plurality of users.

In some embodiments of the present technology, the respective sets of documents 216 include images.

The method 500 advances to step 504.

STEP 504: acquiring for each search query of the plurality of search queries, respective traffic information, the respective traffic information including a respective number of submissions At step 504, the training server 150 acquires, from the query log 136 and the user interaction log 138, for each respective query 214 of the plurality of queries 212, respective traffic information 220. The respective traffic information 220 includes respective user interaction data 222 related to the respective query 214, such a respective number of submissions. In some embodiments of the present technology, the respective traffic information 220 further includes a respective traffic source 224.

The method 500 advances to step 506.

STEP 506: determining based on the respective number of submissions, the search query At step 506, the training server 150 filters the plurality of queries 212 based on the respective traffic information 220 to determine a set of queries 240, the set of queries 240 including at least one query being associated with a potentially misclassified document. In some embodiments of the present technology, the search engine monitoring procedure 210 filters the plurality of queries 212 based on the respective traffic source 224 being one of a predetermined list of traffic sources 228 to determine the set of queries 240.

In some embodiments of the present technology, the training server 150 extracts a set of content features 245 for the set of queries 240, the set of content features 245 including an indication of each of the set of queries 240. The set of content features 245 may include a plurality of predetermined words.

The method 500 then ends.

Figure 7:
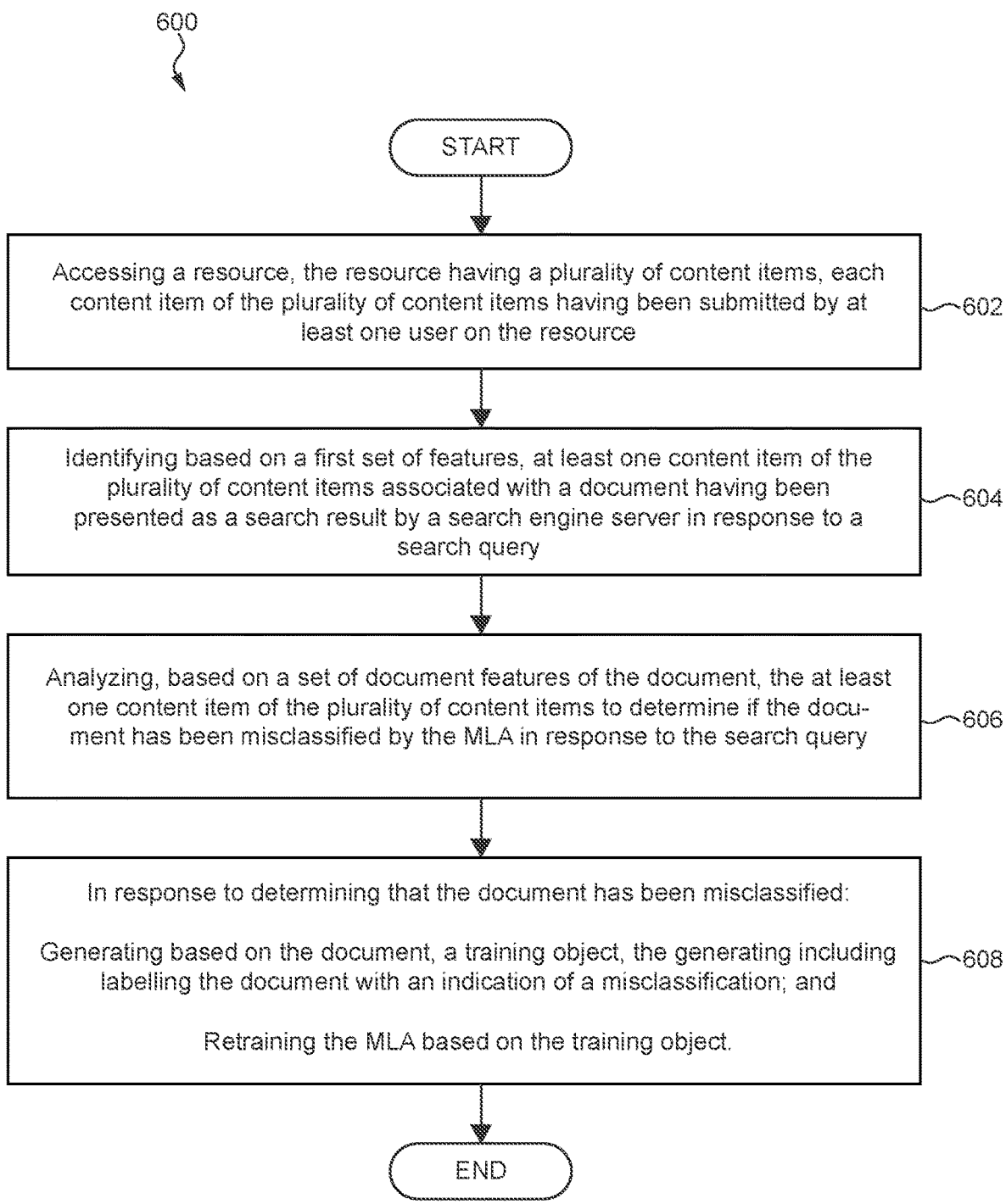
FIG. 7 depicts a block diagram of a method of retraining a machine learning algorithm, the method executable within the system of FIG. 1 in accordance with non-limiting embodiments of the present technology.

FIG. 7 depicts a flowchart of a method 600 of retraining a machine learning algorithm according to non-limiting embodiments of the present technology.

The method 600 is executed by the training server 150. The training server 150 comprises a processor, and a non-transitory computer-readable medium comprising instructions. The processor, upon executing the instructions, is configured to execute the method 600.

The method 600 begins at step 602.

STEP 602: accessing a resource, the resource having a plurality of content items, each content item of the plurality of content items having been submitted by at least one user on the resource At step 602, the training server 150 accesses a resource associated with the social networking service 146, or acquires information via an application programming interface (API) provided by the social networking service 146. The social networking service 146 has the plurality of content items 148, which have been submitted by users via their respective client devices, such as at least a portion of the plurality of client devices 102. Each content item 252 of the plurality of content items 148 may include documents such as text, images, music, videos, hyperlinks, digital files or a combination thereof. In some embodiments of the present technology, a given content item 252 of the plurality of content items 148 may include respective metadata 258 describing content or a theme of the given content item 252.

The training server 150 acquires at least a portion of the plurality of content items 148 on the social networking service 146.

The method 600 advances to step 604.

STEP 604: identifying based on a first set of features, at least one content item of the plurality of content items associated with a document having been presented as a search result by a search engine server in response to a search query At step 604, the training server 150 identifies, based on the set of content features 245, at least a portion of the plurality of content items 148 on the social networking service 146 to identify a set of identified content items 260, which may include potentially misclassified documents. The training server 150 identifies, in each identified content item 262 of the set of identified content items 260, at least a portion of at least one potentially misclassified document 282 to form the set of potentially misclassified documents 280.

In some non-limiting embodiments of the present technology, the training server 150 may analyze the portion of the plurality of content items 148 that respect a set of conditions (not depicted). The set of conditions (not depicted) may include conditions such as specific time period, specific type of content, specific demographic group, specific metadata, and specific users, discussion groups or companies for example.

In some non-limiting embodiments of the present technology, each potentially misclassified document 282 is associated with respective document information 284. The respective document information 284 includes an indication of the respective identified content item 262 from which it has been extracted (not depicted), as well as features from the set of content features 245 having been used to identify the respective identified content item 262 of the plurality of content items 148, such as the query having been used to access the potentially misclassified document 282 on the search engine service 126.

The method 600 advances to step 606.

STEP 606: analyzing, based on a set of document features of the document, the at least one content item of the plurality of content items to determine if the document has been misclassified by the MLA in response to the search query At step 606, the training server 150 acquires the respective set of document features 302 of the potentially misclassified document 282 from a database, such as the search log database 122 for example. In other embodiments of the present technology, as an example when the respective set of document features 302 have not been stored, the training server 150 may extract the respective set of document features 302 of the potentially misclassified document 282. The the training server 150 may access the MLA 128 to extract the respective set of document features 302. In some embodiments of the present technology, the document may be an image and the set of document features may be a set of image features.

In some non-limiting embodiments of the present technology, the set of potentially misclassified documents 280 may be submitted to one or more human assessors, such that misclassified documents in the set of potentially misclassified documents 280 may be analyzed by the one or more human assessors to determine if they have been misclassified, as well as the respective class they should belong to. Additionally or alternatively, the set of potentially misclassified documents 280 may be analyzed by another MLA, which may have been trained differently for the same task.

The document misclassification determination procedure 300 determines, from the set of potentially misclassified documents 280, a subset of misclassified documents 320. The subset of misclassified documents 320 includes at least one misclassified document 322.

A misclassified document in the subset of misclassified documents 320 may be misclassified by the MLA 128 due to a variety of reasons, such as "grey-area" document features, i.e. features that may share characteristics with two or more classes, because the MLA has never "seen" similar document features during training, and the like. On the search engine service 126, a given document being misclassified by the MLA 128 may be indicative of a non-responsiveness of the document as a search result to a search query, or the document being non-suitable for the search query. A given document being misclassified by the MLA 128 may be indicative of the document being non-appropriate to a mode of operation of a web browser used by a user submitting the search query, such as web browser operating in parental control mode to restrict sensitive content.

The method 600 advances to step 608.

STEP 608: in response to determining that the document has been misclassified:
  generating based on the document, a training object, the generating including labelling the document with an indication of a misclassification; and
  retraining the MLA based on the training object.

At step 608, in response to determining that the document has been misclassified, the training server 150 generates a set of training objects 330, each training object 332 including a label of a respective corrected class 334 or an indication of a misclassification.

The training server 150 retrains the MLA 128 on at least a first portion of the set of training objects 330 as well as the original training objects having been used to train the MLA 128. The retraining procedure 400 retrains the MLA 128 based on the same set of document features, or on new document features (which may be determined at least partially by operators of the present technology, or determined by the MLA 128), retraining procedure 400 then validates the retrained MLA 428 on a second portion of the set of training objects 330.

It should be apparent to those skilled in the art that at least some embodiments of the present technology aim to expand a range of technical solutions for addressing a particular technical problem, namely improving a performance of a machine learning algorithm executed by a server by using signals from one or more social networking services to detect misclassified documents, and to generate a set of training objects to retrain the machine learning algorithm. An improvement in the performance of the machine learning algorithm executed by the server may save computational resources.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of retraining a machine learning algorithm (MLA), the MLA having been trained to classify documents based on features thereof, the MLA being executed on a search engine server couplable to a database comprising previously submitted search queries and associated documents presented as search results by the MLA and user interaction data with each of the associated documents, the method being executable by the server, the method comprising:

accessing, by the search engine server via the communication network, a social network resource, the social network resource having a plurality of content items, each content item of the plurality of content items having been submitted by at least one user on the social network resource;

identifying, by the search engine server, at least one content item of the plurality of content items, the at least one content item being associated with a document having been previously presented as a search result in response to a previously submitted search query, the at least one content item meeting a predetermined condition corresponding to:

the at least one content item causing an irregular fluctuation in user interaction data for the document during a predetermined period of time, the irregular fluctuation being determined by a statistical analysis of past user interactions with the document;

acquiring from the database, by the search engine server, a set of document features corresponding to features previously used by the MLA to classify the document;

analyzing, by the search engine server, based on the set of document features of the document, the at least one content item of the plurality of content items to determine if the document has been misclassified by the MLA in response to the search query;

in response to determining that the document has been misclassified:

generating, by the server, based on the document, a training object, the generating including labelling the document with an indication of a misclassification; and retraining, by the server, the MLA based on the training object.

2. The method of claim 1, wherein
the method further comprises, prior to the accessing the social network resource:

acquiring, by the server from the database, a plurality of search queries having been previously submitted on the search engine server by a plurality of users, each search query being associated with a respective set of documents having been presented as search results to respective users of the plurality of users;

acquiring, by the search engine server from the database, for each search query of the plurality of search queries, respective traffic information, the respective traffic information including a respective number of submissions; and determining, by the search engine server, based on the respective number of submissions, the search query.

3. The method of claim 2, wherein
the respective traffic information further includes a respective traffic source; and wherein
the determining the search query further comprises determining the social network resource based on the respective traffic source.

4. The method of claim 3, wherein the determining the social network resource is further based on the resource being one of a predetermined list of traffic sources.

5. The method of claim 4, wherein the determining the search query based on the respective number of submissions is further based on the respective number of submissions being above a predetermined threshold during a predetermined period of time.

6. The method of claim 2, wherein
the method further comprises, prior to the accessing the social network resource:

acquiring, by the search engine server from the database, a plurality of search queries having been previously submitted on the search engine server by a plurality of users, each search query being associated with a respective set of documents having been presented as search results to respective users of the plurality of users;

acquiring, by the search engine server from the database, for each search query of the plurality of search queries, respective traffic information, the respective traffic information including a respective number of submissions and a respective traffic source; and determining, by the search engine server, based on the respective number of submissions and the respective traffic source, the resource, the resource being associated with at least one query.

7. The method of claim 1, wherein
the document is an image; and wherein
the set of document features is a set of image features.

8. The method of claim 1, wherein the document being misclassified is indicative of the search result being non-responsive to the search query.

9. The method of claim 1, wherein the document being misclassified is indicative of the search result being non-suitable for the search query.

10. The method of claim 1, wherein the document being misclassified is indicative of the search result being non-appropriate to a mode of operation of a web browser used by a user submitting the search query.

11. The method of claim 1, wherein the MLA is a binary classifier.

12. A search engine server for retraining a machine learning algorithm (MLA), the MLA having been trained to classify documents based on features thereof, the server being couplable to a database comprising previously submitted search queries and associated documents presented as search results by the MLA and user interaction data with each of the associated documents, the search engine server being connected to a communication network, the server comprising:
  a processor;
  a non-transitory computer-readable medium comprising instructions;
  the processor, upon executing the instructions, being configured to:
    access via the communication network, a social network resource, the social network resource having a plurality of content items, each content item of the plurality of content items having been submitted by at least one user on the social network resource;
    identify, at least one content item of the plurality of content items, the at least one content item being associated with a document having been previously presented as a search result in response to a previously submitted search query, the at least one content item meeting a predetermined condition corresponding to:
      the at least one content item causing an irregular fluctuation in user interaction data for the document during a predetermined period of time, the irregular fluctuation being determined by a statistical analysis of past user interactions with the document;
    acquire from the database, a set of document features corresponding to features previously used by the MLA to classify the document;
    analyze, based on a set of document features of the document, the at least one content item of the plurality of content items to determine if the document has been misclassified by the MLA in response to the search query;
    in response to determining that the document has been misclassified:
      generate, based on the document, a training object, the generating including labelling the document with an indication of a misclassification; and
      retrain the MLA based on the training object.

13. The server of claim 12, wherein
the processor is further configured to, prior to the accessing the resource:
  acquire from the database, a plurality of search queries having been previously submitted on the search engine server by a plurality of users, each search query being associated with a respective set of documents having been presented as search results to respective users of the plurality of users;
  acquire from the database, for each search query of the plurality of search queries, respective traffic information, the respective traffic information including a respective number of submissions; and
  determine, based on the respective number of submissions, the search query.

14. The server of claim 13, wherein
the respective traffic information further includes a respective traffic source; and wherein
the determining the search query further comprises determining the social network resource based on the respective traffic source.

15. The server of claim 14, wherein the determining the resource is further based on the resource being one of a predetermined list of traffic sources.

16. The server of claim 15, wherein the determining the search query based on the respective number of submissions is further based on the respective number of submissions being above a predetermined threshold during a predetermined period of time.

17. The server of claim 12, wherein
the processor is further configured to, prior to the accessing the resource:
  acquire from the database, a plurality of search queries having been previously submitted on the search engine server by a plurality of users, each search query being associated with a respective set of documents having been presented as search results to respective users of the plurality of users;
  acquire from the database, for each search query of the plurality of search queries, respective traffic information, the respective traffic information including a respective number of submissions and a respective traffic source; and
  determine based on the respective number of submissions and the respective traffic source, the resource, the social network resource being associated with at least one query.

18. The method of claim 1, wherein the given content item is the at least one content item of the plurality of content items and the condition further comprises:
  determining, by the search engine server, the at least one content item of the plurality of content items is associated with a word included within a predetermined word list.

* * * * *